United States Patent [19]
Watson et al.

[11] Patent Number: 5,853,619
[45] Date of Patent: Dec. 29, 1998

[54] LOW TOXIC CORROSION INHIBITOR

[75] Inventors: James D. Watson; John G. Garcia, Jr., both of Houston, Tex.

[73] Assignee: Nalco/Exxon Energy Chemicals, L.P., Sugar Land, Tex.

[21] Appl. No.: 755,309

[22] Filed: Nov. 22, 1996

[51] Int. Cl.$^6$ .................................................. C23F 11/14
[52] U.S. Cl. .................. 252/391; 252/394; 252/395; 422/16; 422/12; 422/17; 208/47; 507/241; 507/129
[58] Field of Search .................... 252/391, 394, 252/395; 422/16, 17, 12; 208/47; 507/241, 242, 129, 138

[56] References Cited

U.S. PATENT DOCUMENTS

| | | | |
|---|---|---|---|
| 3,197,403 | 7/1965 | Riggs | 252/8.55 |
| 4,450,138 | 5/1984 | Thompson et al. | 422/12 |
| 4,495,336 | 1/1985 | Hausler et al. | 252/8.55 |
| 4,762,627 | 8/1988 | Martinez et al. | 252/8.555 |
| 5,300,235 | 4/1994 | Clewlow et al. | 252/8.555 |

*Primary Examiner*—Jacqueline V. Howard
*Assistant Examiner*—Monique T. Cole
*Attorney, Agent, or Firm*—Kelly L. Cummings; Thomas M. Breininger

[57] ABSTRACT

A low toxic corrosion inhibitor comprises (A) mercaptocarboxylic acid having from 2 to 6 carbon atoms, and (B) a polyamine/fatty acid/carboxylic acid adduct. The preferred combination of (A) and (B) includes mercaptoacetic acid and ethylenetetramine/tall oil acd/acrylic acid adduct.

12 Claims, 1 Drawing Sheet

LOW TOXIC CORROSION INHIBITOR

BACKGROUND OF THE INVENTION

The present invention relates to a method of inhibiting corrosion of ferrous metals in oil and gas-field applications, in particular in situations where they may come into contact with the natural environment e.g. by discharge of produced water, and to a method of inhibiting corrosion using these materials. In one aspect, the invention relates to a method which employs a low toxicity corrosion inhibitor.

In order to preserve metals, and particularly ferrous metals, in contact with corrosive liquids in gas- and oil-field applications, corrosion inhibitors are added to many systems, e.g. cooling systems, refinery units, pipelines, steam generators and oil production units, formation treating fluids (e.g. acidizing fluids). A variety of corrosion inhibitors are known. For example, GB-A-2009133 describes the use of a composition which comprises an aminecarboxylic acid such as dodecylamine propionic acid, and a nitrogen-containing compound containing an organic hydrophobic group, such as N-(3-octoxypropyl) propylenediamine or a cyclic nitrogen containing compound such a morpholine, cyclohexylamine or an imidazoline.

U.S. Pat. No. 3,445,441 describes amino-amido polymers which are the reaction product of a polyamine and an acrylate-type compound, which polymers may be cross-linked. The polymers have several uses including use as corrosion inhibitors.

Although corrosion inhibitors of many types are known, the materials which have been found most effective in practice have the disadvantage of toxicity to the environment. Toxicity to the marine or freshwater environment is of particular concern. In gas and oil field applications, much work is done off shore or on the coast. If a corrosion inhibitor enters the sea or a stretch of fresh water, then, even at relatively low concentrations, the corrosion inhibitor can kill microorganisms, fish, shrimp, or other aquatic life, causing an imbalance in the environment. Attempts have therefore been made to identify materials which are successful corrosion inhibitors but at the same time are less toxic to the environment than known inhibitors.

U.S. Pat. Nos. 5,300,235 and 5,322,630 discloses dialkyl/fatty/carboxylic acid adducts for use in oil field operations and which exhibit low toxicity. The adducts of fatty amine derivative, e.g. a fatty imidazoline, and an unsaturated acid, and in which the product contains preferably no primary amino groups and, more preferably no secondary groups, has a lower toxicity to the environment (referred to as ecotoxicity), than many known corrosion inhibitors.

SUMMARY OF THE INVENTION

As mentioned above, the method of the present invention employs a corrosion inhibitor which exhibits low toxicity and improved corrosion inhibition. The corrosion inhibitor comprises two components:

(A) mercaptocarboxylic acid having from 2 to 6 carbon atoms (straight chain or branched), and (B) a dialkyl/fatty acid/carboxylic acid adduct having the following formula 1:

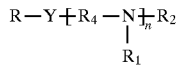

where

R is a $C_{6-20}$ hydrocarbon;

$R_4$ is an alkyl group having from 2 to 6 carbon atoms; and n is an integer of 1 to 6;

Y is one of the following:

(a) —$NR_1$— where n is 1, 2, or 3;
(b) —CO—NH— where n is an integer 1–6;
(c)

in which X is an alkalene group of 2 to 6 carbon atoms and n is an integer of 1 to 6;

$R_1$ is independently H, or —$[(CH_2)_p]$ COOH or a $C_{6-20}$ hydrocarbon, or a $C_{6-20}$ hydrocarbon carbonyl;

$R_2$ is H, or $[(CH_2)_p]$ COOH or a $C_{6-20}$ hydrocarbon or $C_{6-20}$ hydrocarbonyl, where R1 is the same or different from $R_2$, and p is an integer ranging from 1 to 4, where the compound contains at least one $(CH_2)_p$ COOH group or salt thereof and no primary amines.

As used herein, term $C_{6-20}$ hydrocarbon carbonyl means a group having the following formula:

where $R_3$ is a $C_5$–$C_{19}$ hydrocarbon.

The mercaptocarboxylic acid component preferably mercaptoacetic acid and beta-mercaptopropionic acid, with the former being most preferred. These acids are water soluble and available commercially in various concentrations in water. From 1 to 20 wt. % solutions of mercaptoacetic acid are preferred for use in the method of the present invention, with 2 to 10 wt. % solutions being most preferred.

The Component B adduct is prepared by (a) reacting a fatty amine with (an unsaturated) carboxylic acid or (b) reacting a fatty acid with an amine to form an amide or imidazoline and then reacting this product with an unsaturated carboxylic acid. The final compound contains no primary amines and preferably no secondary amines.

As described in U.S. Pat. No. 5,300,235, the component (B) adducts have favorable ecotoxicity levels in marine or freshwater environments. The ecotoxicity decreases with increasing substitutions on the N atoms present i.e. it appears that tertiary groups are less toxic than secondary groups which are in turn less toxic tan primary groups. Preferably, therefore, each amine group is secondary or tertiary, most preferably tertiary.

Use in a marine or freshwater environment is intended to mean use in an environment in which the corrosion inhibitor in normal usage may come into contact with an area of seawater or fresh water or land.

Components (A) and (B) may be introduced separately in the liquid, but preferably are used in a formulation. The weight ratio (actives) of components (A) and (B) may range from 1:100 to 100:1, preferably from 1:5 to 5:1, and most preferably from 2:1 to 1:2. The concentration of the two component corrosion inhibitors in the liquid may range from 1 to 200 ppm, preferably from 1 to 100 ppm, and most preferably 5 to 50 ppm.

DESCRIPTION OF THE PREFERRED EMBODIMENTS

Figure 1:
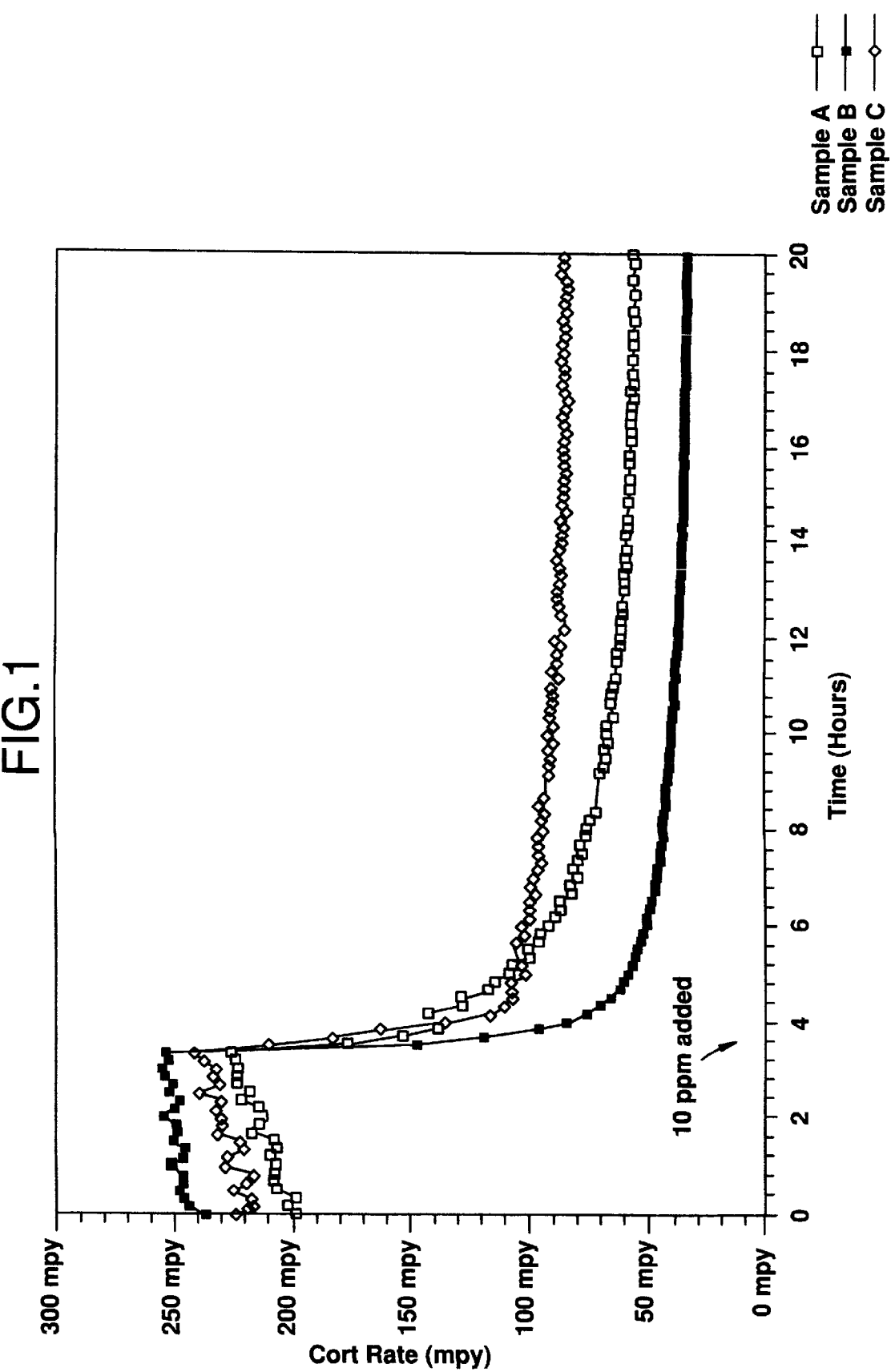
FIG. 1 is a plot comparing corrosion inhibition of the two component corrosion inhibitor with each component separately.

Each of the components used in the method of the present invention are described below:

Component (A)

As mentioned above water soluble mercaptocarboxylic acid having from 2 to 6 carbon atoms is commercially available. For example, 96 to 100 wt. % of the mercaptoacetic acid can be obtained from Elf Atochem North America under the trade designation of thioglycolic acid.

Component (B)

Component B, have the general formula I above, has two preferred embodiments: Formula IA and Formula IB described below.

The corrosion inhibitor of FORMULA IA where Y is —$NR_1$— and $R_2=R_1$ may be represented as follows:

(IA)

where, $R_4$ and n are as described in FORMULA I, and $R_1$ is H, —$[(CH_2)_p]$ COOH, or $C_{6-20}$ hydrocarbon wherein the compound contains at least one $(CH_2)_p$ COOH or salt thereof and no primary amines.

The hydrocarbon group or groups of from 6 to 20 carbon atoms of FORMULA IA and IB (described below) may be straight or branched, saturated or unsaturated, and may be aliphatic or may contain one or more aromatic groups. Preferably the hydrocarbon group is straight chain aliphatic and is saturated, optionally with up to 20% of the chains being unsaturated. Preferably the hydrocarbon contains 12 to 20 carbon atoms, more preferably 16 to 20 carbon atoms. It is preferred that R is the hydrocarbon residue of a naturally occurring fatty acid, which is optionally hydrogenated e.g. the residue of caproic, caprylic, capric, lauric, myristic, palmitic, stearic, palmitoleic, oleic, linoleic or linolenic acid. The amines used in the present invention can conveniently be formed by the reaction of a fatty amine and an unsaturated acid in which case R corresponds to the fatty part of the amine. Fatty amines are readily available in which the fatty portion is a mixture of hydrocarbon groups. For example, the amine, diamine or triamine of hydrocarbon residue of tall oil, coconut oil or tallow oil are readily available.

When $R_1$ of FORMULA IA is a hydrocarbon it may be the residue of a naturally occurring fatty acid as described above for R, or it may be an artificially synthesized hydrocarbon. If $R_1$ is a hydrocarbon, it is preferably a residue of a naturally occurring fatty acid.

However, $R_1$ is preferably H or —$[(CH_2)_p]$COOH, and most preferably —$[(CH_2)_p]$ COOH. The alkyl group may be straight chain or branched. Conveniently the compound of FORMULA IA is produced by adding acrylic acid to a fatty amine, which results in a compound in which $R_1$ is —$CH_2$—$CH_2COOH$.

The $C_{2-6}$ alkyl group $R_4$ linking the fatty hydrocarbon and amino groups in the compound of FORMULA IA may be straight or branched. Conveniently it is a propylene or hexylene group since the starting amines are either available commercially or can be readily synthesized.

The amine of FORMULA IA may contain 1, 2, 3 or 4 amino groups. It is preferred for it to contain 2 amino groups since the tests carried out so far suggest that such compounds provide the optimum in terms of ease of production and handling, good corrosion inhibition properties and low ecotoxicity. Diamine compounds correspond to compounds of the FORMULA IA in which n is 1.

The amine may be present in the form of a salt, for example an alkali metal salt such as sodium or potassium, an alkaline earth metal salt such as magnesium or calcium, or an ammonium salt.

Preferred amines of FORMULA IA include those of FORMULA IIA:

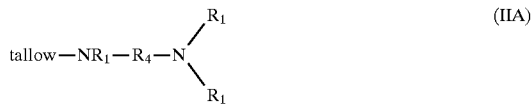
(IIA)

in which tallow indicates the reside of an acid found in beef tallow, and each $R_1$ is independently (a) H or (b) —$R_4$COOH and salts thereof. Preferably $R_1$ is —$[(CH_2)_p]$COOH, conveniently $CH_2CH_2COOH$. Thus a particularly preferred compound is of FORMULA IIIA;

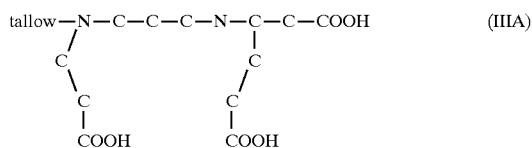
(IIIA)

Compounds of the FORMULA IA in which R1 is H, a C6–20 hydrocarbon or —$(CH_2)_p$ COOH may conveniently be produced by reacting an amine of the FORMULA IVA

(IVA)

where R and n are as defined above and $R_1$ is H or $C_{6-20}$ hydrocarbon, with an acid of FORMULA VA

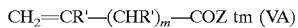

$CH_2=CR'—(CHR')_m—COZ$ tm (VA)

in which m is 0, 1 or 2, each R' is hydrogen or when m is 1, R' may be methyl, and Z is OH or alkyl. To produce a compound in which $R_1$ is H, a $C_{6-20}$ hydrocarbon, or —$[(CH_2)_p]$COOH, the amine of FORMULA IVA may be reacted with chloro acid or FORMULA VIA

Cl—$[(CH_2)_p]$COOH (VIA)

The molar ratio of acid of FORMULA VA or VIA to amine of FORMULA IVA should be chosen to ensure the desired level of substitution takes place. Typically therefore to avoid the presence of primary amine groups the molar ratio will be at least 2:1, more preferably 3:1, more preferably 4:1 when the starting amine is a triamine and so on. A slight molar excess (e.g. about 10%) of acid is generally used, e.g. for a dismine the acid may be used in a molar ratio of about 3.3:1.

Preferably the compounds of FORMULA IA are made by reacting the compounds of FORMULA IVA and VA since if the chloro acid is used as a starting material, it is generally difficult to remove all the chlorine-containing material from the product, and chlorine-containing compounds can damage the environment. Preferably the acid is acrylic acid.

The reaction of acrylic acid with the primary amine yields predominantly the B-amine propionic acid derivative directly. Depending on the distance between the amino group and the acid group, the product may be a cyclic internal salt.

The reaction may be carried out by heating a solution of the amine in a suitable solvent, conveniently an alcohol such as isobutanol or isopropanol or water. The required quantity of the acid is gradually introduced. The temperature at which the reaction is carried out is generally from 50° C. up to the reflux temperature of the reaction mixture, typically 60° to 100° C.

The compounds tend not to be soluble in water or brine, but are dispersible to some extent in water.

The corrosion inhibitor of FORMULA IB may be represented as follows:

(IB)

Y' is the group represented in (b) and (c) of FORMULA I; and where n, R, $R_1$, $R_2$ and $R_4$ are described in FORMULA I and wherein the compound contains at least one $(CH_2)_p$ COOH group and no primary amines. $R_2$ is preferably H, or the carboxylic acid group, or the carbonyl group.

The amine derivative ($Y^1$) may contain a heterocyclic group of the formula

In this formula X may be an alkylene group of 2 to 6 carbon atoms e.g. ethylene or propylene. When X is ethylene, the heterocyclic group is imidazoline. X may be straight chain or may be branched, such that the heterocyclic ring is substituted by an alkyl of up to 4 carbon atoms.

The derivative of FORMULA IB may contain one or more amido groups.

$R_1$ in the derivative of FORMULA IB is preferably H or a carboxylic acid group of 2 to 5 carbon atoms. Tests currently appear to indicate tertiary groups are less toxic than secondary amino groups, which are in turn less toxic than primary amino groups. If a heterocyclic ring is present the nitrogen atoms in the ring re considered tertiary. In view of the favorable results shown for N-substitution it is preferred that each R1 is a carboxylic acid group. Conveniently, $R_1$ is derived from acrylic acid, in which case R1 in FORMULA IB is —$CH_2CH_2$COOH. $R_2$ is similarly conveniently derived from acrylic acid and is therefore preferably —$CH_2CH_2$COOH or H.

The derivative may optionally contain 1 or more alkyl amino groups between the group $Y^1$ and the group $R_2$. Each amino group may be optionally substituted by an acid group or a $C_{6-20}$ hydrocarbon or $C_{6-20}$ hydrocarbon-carbonyl. Preferably the derivative contains 2 or 3 amino groups i.e. n is 2 or 3.

The $C_{2-6}$alkyl group linking the group $Y_1$ and each amino group may be a straight or branched alkyl group. Conveniently, it is an ethylene, propylene or hexylene group since the starting amines to produce such compounds are either available commercially or can be readily synthesized.

The derivative may be present in the form of a salt, for example an alkali metal salt such as sodium or potassium, an alkaline earth metal salt such as magnesium or calcium, or an ammonium sale.

Particularly preferred derivatives are those of FORMULA (IIB).

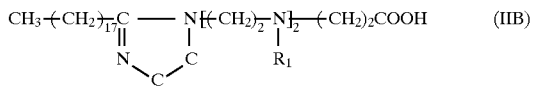
(IIB)

where each $R_1$ is H or $(CH_2)_2$COOH.

Compounds of the FORMULA IB may conveniently be produced by reacting an amine or a heterocyclic compound with an unsaturated acid. This may be represented as reacting a compound of the FORMULA (IIIB):

(IIIB)

in which R, $R_4$ Y and n are as defined above and each $R_1$' is independently H, $C_{6-20}$ hydrocarbon, or $C_{6-20}$ hydrocarbon-carbonyl with an acid of the FORMULA (IVB):

(IVB)

in which m is 0, 1 or 2, each R' is hydrogen or, when m is 1, R' may be methyl, and Z is OH or alkoxy. If Z is alkoxy the product is hydrolysed to produce the corresponding acid.

The salt, if desired, may be formed using processes known in the art.

The amine derivatives may also be produced by reacting a compound of the FORMULA IIIB as defined above with an acid of the FORMULA VB:

(VB)

where Q is halogen, preferably chloro, and optionally forming a salt thereof.

The molar ratio of acid of FORMULA IVB or VB to form the compound of FORMULA IIIB should be chosen to ensure that the desired level of N-substitution takes place. N-atoms which are part of an amide group will not react with the acid but any other —NH— groups will react. Typically, therefore, to avoid the presence of primary amino groups the molar ratio will be at least 1:1 when n is 1 and R'1 is H. A slight molar excess (e.g. about 10%) of acid is generally used, e.g. for n=1 and $R^1$=H, the acid is preferably used in a molar ratio of about 2.2:1.

Preferably the compounds of FORMULA IB are made by reacting the compounds of FORMULA IIIB and IVB since if the chloro acid is used as a starting material it is generally difficult to remove all the chlorine-containing material from the product, and chlorine-containing compounds can damage the environment. Preferably, the compound of FORMULA IVB is acrylic acid.

The reaction of compounds of FORMULA IIIB and IVB or BV may be undertaken by dissolving the compound of FORMULA IIB in a convenient solvent, e.g. secondary butanol, adding the acid and heating the mixture until the reaction is complete. The reaction may be carried out at temperatures of from room temperature up to the reflux temperature of the reaction mixture, typically 60° C. to 120° C.

The starting compounds of FORMULA IIIB may be synthesized by reacting a fatty acid with an alkyl amine. Suitable fatty acids as described above, with respect to the derivation of R. In particular, tall oil fatty acid (TOFA) and oleic acid are suitable starting materials. The acid and amine initially react to produce an amide i.e. a compound of the FORMULA IIIB in which Y is —CO—NH— Dehydrolysis of the amide results in cyclisation to give compound of the FORMULA IIIB in which Y is a heterocyclic ring. An incomplete cyclisation reaction results in a mixture of compounds of FORMULA IIIB in which Y is an amide group and those in which Y is a heterocyclic ring. Some starting material and some mono-, di- or polyamides may also be present, depending on the starting amine in the system. This mixture may be used to produce a successful corrosion inhibitor.

The alkyl amine is chosen to give the appropriate heterocyclic ring and/or amide group(s) and, if desired, alkyl amine group attached to the heterocyclic ring or amide. Suitable alkyl amines include e.g. ethylene diamine, diethylenetriamine (DETA), triethylenetetramine (TETA) and tetraethylenepentamine (TEPA).

The reaction of the fatty acid and alkyl amine may be carried out by heating the reactants in a suitable solvent e.g. an aromatic hydrocarbon. The reaction may be carried out initially at the reflux temperature of the mixture, e.g. 140° to 180° C., and the temperature may be increased to e.g. 200° to 230° C. to form the heterocyclic ring.

Operation

As mentioned above, the method of the present invention employs mercaptocarboxylic acid (Component A) and an amine corrosion inhibitor of FORMULA I (Component B) in oil field operations. The two component corrosion inhibitor may be added to the oil filed liquids in the form of a solution or dispersion in water or an organic solvent. Examples of suitable solvents are alcohols such as methanol, ethanol, isopropanol, isobutanol, secondary butanol, glycols and aliphatic and aromatic hydrocarbons. The solubility of the compounds in water can be improved by forming a salt e.g. a sodium, potassium, magnesium or ammonium salt.

The amount of active ingredient in the composition required to achieve sufficient corrosion protection varies with the system in which the two-component inhibitor is being used. Methods for monitoring the severity of corrosion different systems are well known, and may be used to decide the effective amount of active ingredient required in a particular situation. The compounds may be used to impart the property of corrosion inhibition to a composition for use in an oil or gas field application and which may have one or more functions other than corrosion inhibition, e.g. scale inhibition.

In general it is envisaged that the corrosion inhibitor used in amounts of up to 1000 ppm, but typically within the range of 1 to 200 ppm, preferably from 5 to 50 ppm.

The two component corrosion inhibitor may contain the materials which it is known to include in corrosion inhibiting compositions e.g. scale inhibitors and/or surfactants. In some instances, it may be desirable to include a biocide in the composition.

The two component corrosion inhibitor may be used in a variety of petroleum operations in the gas and oil industry. They can be used in primary, secondary and tertiary oil recovery and be added in a manner known per se. Another technique is primary oil recovery where they can be used is the squeeze treating technique, whereby they are injected under pressure into the producing formation, are adsorbed onto the strata and absorbed as the fluids are produced. They can further be added in the water flooding operations of secondary oil recovery as well as be added to pipelines, transmission lines and refinery units. They may also be used to inhibit acid solution in well acidizing operations.

EXAMPLES

Shrimp Kill Tests

LC 50 Evaluation

Tests were carried out to determine the minimum concentration of chemical to achieve the death of 50% of a population. Shrimp was selected as the test organism because of its higher sensitivity. Thus the toxicity test results on shrimp are indicative of toxicity of the chemical on fish.

The test procedure used in the toxicity tests were in accordance with approved EPA methods described in EPA Publication EPA 600 4-90 027 (September 1991) entitled "Methods for Measuring the Acute Toxicity of Effluents and Receiving-Waters to Freshwater and Marine Organisms" (Fourth Edition), the disclosure of which is incorporated herein by reference.

The LC 50 Tests were carried out for 48 hours on the following chemicals:

Sample A: a 5% aqueous solution of a quaternary amine;
Sample B: a 5% aqueous solution of a quaternary amine; and Sample C: a 5% aqueous solution of mercaptoacetic acid.

The EPA reference toxicant was CdCl using Mysidopsis Bahia. The results are presented in Table I which indicates the concentration of each sample to achieve the 50% death o the shrimp:

TABLE 1

|  | LC 50 ppm |
| --- | --- |
| Sample A | 17.28 |
| Sample B | 84.55 |
| Sample C | 2915.43 |

The results demonstrate that Sample C (mercaptoacetic acid) was far less toxic than Samples A or B (quaternary amine corrosion inhibitor).

Corrosion Inhibition Tests

Corrosion inhibition was measured using an RCE bubble test.

The RCE "bubble test" apparatus consists of several 1 liter cylindrical pyrex glass vessels. Brine (600 ml) is added to each pot and carbon dioxide gas bubbled into the system while heating to 90° C. After oxygen has been removed (e.g. half an hour at 90° C.), cylindrical mild steel probes re inserted into the hot brine and kerosene (200 ml) carefully poured on top of the aqueous phase. Other hydrocarbons e.g. crude oil can be used instead of kerosene. If a "sweet" test is required, the system is now sealed. Corrosion rate readings (in mpy) are now initiated using a linear polarisation meter and recorder. Readings are then taken throughout the course of an experimental run. After three hours, the rate of corrosion has usually achieved equilibrium and a blank corrosion rate is taken. Ten ppm or corrosion inhibitor is then injected into the hydrocarbon phase of the system to test the water partitioning properties of each chemical.

The samples tested were as follows:

Sample A: a 25% aqueous solution of ethylenetetraamine/ tall oil fatty acid/acrylic acid adduct;

Sample B: a 23.75% aqueous solution fatty acid/acrylic acid adduct and a 5% aqueous solution of mercapto acetic acid (total actives 28.75 wt. %); and Sample C: a 5% aqueous solution of mercaptoacetic acid.

FIG. 1 presents plots of the tests on the 3 samples. The plots show a synergistic effect of the mixture of the adduct and mercaptoacetic acid. Sample B inhibitor stabilized at 30 mpy at about 8 hours whereas Sample A provided a minimum corrosion rate of 50 mpy and Sample C provided a minimum corrosion rate of 85 mpy.

Additional tests were carried out on the 3 samples at 10 ppm and 25 ppm. Table II presents these date after 20 hours of testing for 10 ppm treatment. At 20 hours and additional 15 ppm inhibitor was added and readings were taken after 3 more hours for a total of 23 hours.

|  | Corrosion Rate (mpy) | |
| --- | --- | --- |
|  | 10 ppm | 25 ppm |
| Sample A | 90 | 42 |
| Sample B | 40 | 20 |
| Sample C | 70 | 42 |

Note that Samples A and C gave less protection at 25 ppm than the two component corrosion inhibitor (Sample B) at 10 ppm.

The above test data, coupled with the test data presented in U.S. Pat. No. 5,300,235, demonstrate that the two component corrosion inhibitor (a) possesses low toxicity properties, and (b) exhibits synergistic corrosion inhibition properties.

What is claimed is:

1. A method of inhibiting corrosion of a ferrous metal by a fluid encountered in petroleum operations, which comprises:

(a) introducing into the fluid inhibiting amounts of a two-component corrosion inhibitor comprising (A) mercaptoacetic acid and (B) an amine derivative having the formula of

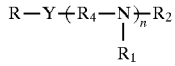

Where
n is an integer of 1 to 6;
R is a $C_{6-20}$ hydrocarbon group;
$R_4$ is an alkyl group having from 2 to 6 carbon atoms;
$R_1$ and $R_2$ are independently $(CH_2)_p$ COOH groups where p is an integer of 1 to 4; and
Y is selected from the group consisting of an amide having the formula of —CO—NH— and an imidazoline group having the formula

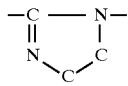

2. The method of claim 1 wherein the components (A) and (B) are in an aqueous solution in a weight ratio ranging from 1:99 to 99:1.

3. The method of claim 2 wherein the concentration two-component corrosion inhibitor in the fluid ranges from 1 to 1000 ppm.

4. The method of claim 3 wherein said concentration ranges from 1 to 200 ppm.

5. The method of claim 1 in which R is a hydrocarbon of 16 to 20 carbon atoms.

6. The method of claim 1 in which R is a hydrocarbon obtained from tall oil, coconut oil, beef tallow or naphthenoic acid.

7. The method of claim 1 in which $R_1$ and $R_2$ are each $(CH_2)_2$—COOH.

8. The method of claim 1 in which n is 2 or 3.

9. The method of claim 1 in which Y is the imidazoline group.

10. The method of claim 1 wherein the mercaptoacetic acid comprises from 1 to 50 weight percent of the actives in the two component corrosion inhibitor.

11. The method of claim 1 wherein R is a fatty acid, Y is imidazoline and $R_1$ and $R_2$ are each acrylic acid groups.

12. The method of claim 1 wherein the amine derivative has the following formula:

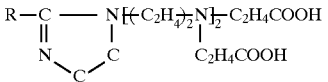

where R is an aliphatic hydrocarbon group containing from 12 to 20 carbon atoms.

* * * * *